United States Patent

Kuftedjian et al.

[11] Patent Number: 6,105,057
[45] Date of Patent: Aug. 15, 2000

[54] METHOD AND APPARATUS FOR MANIPULATING MUTEXES ON NETWORK ASSETS

[75] Inventors: Ohaness Kuftedjian, Irvine; Cory Lam, Hacienda Heights; Stephen Wright, Huntington Beach, all of Calif.

[73] Assignee: Ericsson Inc., Research Triangle Park, N.C.

[21] Appl. No.: 09/014,504

[22] Filed: Jan. 28, 1998

[51] Int. Cl.[7] ..................................................... G06F 13/18
[52] U.S. Cl. .................... 709/213; 709/223; 709/226; 707/104; 711/151
[58] Field of Search ...................................... 709/102, 103, 709/104, 107, 202, 203, 213, 214, 215, 216, 217, 219, 223, 225, 226; 707/9, 10, 100, 104, 200, 201; 711/147, 150, 151, 152, 155, 158

[56] References Cited

U.S. PATENT DOCUMENTS

| | | | |
|---|---|---|---|
| 5,161,227 | 11/1992 | Dias et al. | 709/104 |
| 5,644,768 | 7/1997 | Periwal et al. | 709/102 |
| 5,737,611 | 4/1998 | Vicik | 710/200 |
| 5,761,659 | 6/1998 | Bertoni | 707/8 |
| 5,761,670 | 6/1998 | Joy | 707/103 |
| 5,832,484 | 11/1998 | Sankaran et al. | 707/8 |

*Primary Examiner*—Viet D. Vu
*Attorney, Agent, or Firm*—Jenkens & Gilchrist, P.C.

[57] ABSTRACT

A system and technique enables network level locks, called network mutexes, on network objects such as databases and ports. A remote data server (RDS) element resides on a server for receiving network mutex (NM) request from remote clients. A NM request includes, in part, a network mutex name, a locking priority, identification of the requesting element and client, and an indication as to whether the network mutex may be shared with other equivalent applications or elements. The RDS element grants the NM request when no other application or element has established the network mutex or the network mutex is held by an equivalent application or element and is in a sharable status. Network mutexes are removed when the remote locking client transmits a NM unlock request. Network mutexes enable central control of the locking and unlocking of network objects.

24 Claims, 6 Drawing Sheets

METHOD AND APPARATUS FOR MANIPULATING MUTEXES ON NETWORK ASSETS

BACKGROUND OF THE INVENTION

1. Technical Field of the Invention

The present invention relates in general to computer networks, and in particular, to implementing network mutexes in a computer network.

2. Description of Related Art and Objects of the Invention

In many offices and universities around the world, computer networks connect each computer to every other computer in an associated system. Connecting computers provides many benefits. First, it enables fast communication between and among users, e.g., e-mail. Second, software programs can be stored at a central computer and retrieved by individual computers as needed to thereby reduce memory storage requirements at the individual computers. Third, files can be shared between and among various computer users. In other words, one person can work on a document and then save or store it at a central computer. A second person can then request the document from the central computer and continue working on it. Fourth, resources such as databases and communication ports can be shared by all individual computers. This sharing reduces resource duplication and therefore is more economical. In short, computer networks are designed to empower computer users to share programs, information, and computing resources between and among users.

Figure 1:
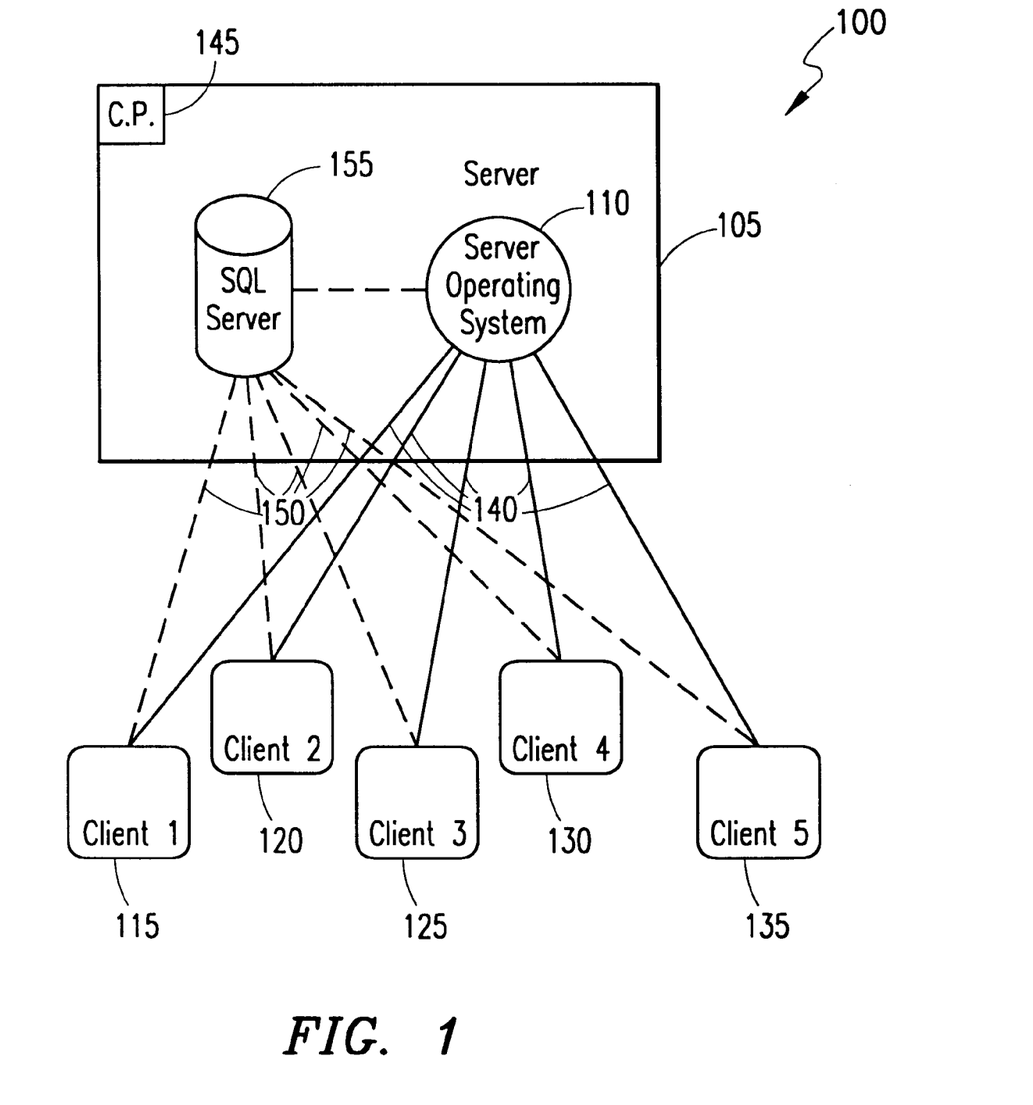
FIG. 1 illustrates a conventional computer network.

Referring first to FIG. 1, a conventional computer network system 100 is illustrated. The above-described features of computer networks are realized with network systems composed of three principle parts. The first part is composed of one, two, a hundred, or even more computers that are directly interacted with by the computer users. Each computer user and/or corresponding computer are individually or as a pair referred to as a client. First, second, third, fourth, and fifth clients 115, 120, 125, 130, and 135 are shown in FIG. 1. The second part of computer networks is composed of one or more servers, which can centrally store files and programs as well as provide a gateway to resources that are to be shared throughout a portion or all of the network. A server 105 is also shown. The first, second, third, fourth, and fifth clients 115, 120, 125, 130, and 135 are linked to the server 105 via a third part, the operating system (OS) network connections 140.

Each of the first, second, third, fourth, and fifth clients 115, 120, 125, 130, and 135 as well as the server 105 has an operating system, which is the primary software for controlling each computer. In the server 105, a server operating system (OS) 110 controls the operations, including rudimentary file-locking features, of the server 105. The server OS 110 does not, however, provide the ability to lock non-intelligent objects such as communication port 145. The ability to lock out, or more broadly mutually exclude (often abbreviated "mutex"), others from a network resource is critical for many computing functions.

In the conventional computer network system 100, structured query language (SQL) server network connections 150 connect each client to SQL server 155. Note that although the OS network connections 140 and the SQL server network connections 150 are logically different, they may transmit data over the same physical medium. The SQL server 155 is an intelligent object that contains databases and can have its own locking mechanism. For example, the first client 115 can request via an SQL server network connection 150 to lock elements of the SQL server 155 such as tables or rows within tables of a given database. Any subsequent request by another client, such as the second client 120, will be refused or delayed until the first client 115 has released the lock on the particular element of the SQL server 155. Unfortunately, the first client 115 cannot lock the entire SQL server 155.

Additionally, conventional computer networks do not provide any means to lock virtual objects. Even if the first client 115 were able to lock a particular object, a crash or other loss of communication by the first client 115 can render the object unlockable by other clients. In this instance, the first client 115 never relinquishes control of the virtual object, and no other client, including the second client 120, will be able to gain access to the virtual object. Also, it has not been possible to determine which element has locked a network resource, the location of the locking element on the network, or the amount of time the resource has been locked.

Furthermore, prior art locking techniques do not permit the setting of locking priorities, which enables the overriding of existing locks. Also, conventional locking techniques do not allow equivalent elements and applications to share locks.

In summary, mutexes have heretofore not been implemented at the network level. The current invention addresses the above (and other) deficiencies in the prior art by achieving the following (and other) objects of the invention:

An object of the invention is to provide a locking/unlocking mechanism at the network level.

Another object of the invention is to provide a network mutex feature for network objects and resources.

Yet another object of the invention is to implement a network mutex in which the lock is relinquished automatically if the locking element crashes or loses its connection.

A further object of the invention is to implement a network mutex that is applicable to objects and resources such as intelligent objects that have their own locking mechanism, non-intelligent objects that do not have their own locking mechanism, and virtual objects.

Yet a further object of the invention is to implement a network mutex that permits locking priorities and the overriding of existing locks.

A still further object of the invention is to implement a network mutex in which locks can be shared by equivalent elements or applications.

SUMMARY OF THE INVENTION

These and other objects of the invention are achieved with a computer network system and technique that enables network-level control of locks, called network mutexes, on network objects and resources. The network objects and resources, or network assets generally, can be intelligent, non-intelligent, virtual, etc. The network mutex can therefore provide locking functions for network assets that have their own local locking ability as well as those that have no inherent locking ability.

According to the network mutex (NM) functionality of the current invention, a remote client transmits a NM request to a remote data server (RDS) element located at a server. The RDS element will grant the NM request and transmit a success message to the remote client if the network mutex for the requested network asset is available. When the remote client has finished with the network asset, it transmits a NM unlock request. The RDS element is empowered to terminate a network mutex, and thus free the network asset, if the locking remote client malfunctions or otherwise disconnects from the server.

The NM request includes several parameters. Among the possible parameters are a network mutex name, a locking priority, a name of the requesting element or application, an identification of the related client device, a logged-in user identification, a logged-in user name, and an indication of whether the requested network mutex is sharable by others of the same element or application type. These parameters enable the implementation of several additional network mutex features.

For example, requesting elements and applications can share a network mutex with other elements and applications of the same type. Furthermore, a NM request can override an existing network mutex if the NM request's priority is higher than the priority of the existing network mutex.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, software elements, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and software code are omitted so as not to obscure the description of the present invention with unnecessary detail.

A preferred embodiment of the present invention and its advantages are best understood by referring to FIGS. 1–6 of the drawings, like numerals being used for like and corresponding parts of the various drawings.

Figure 2:
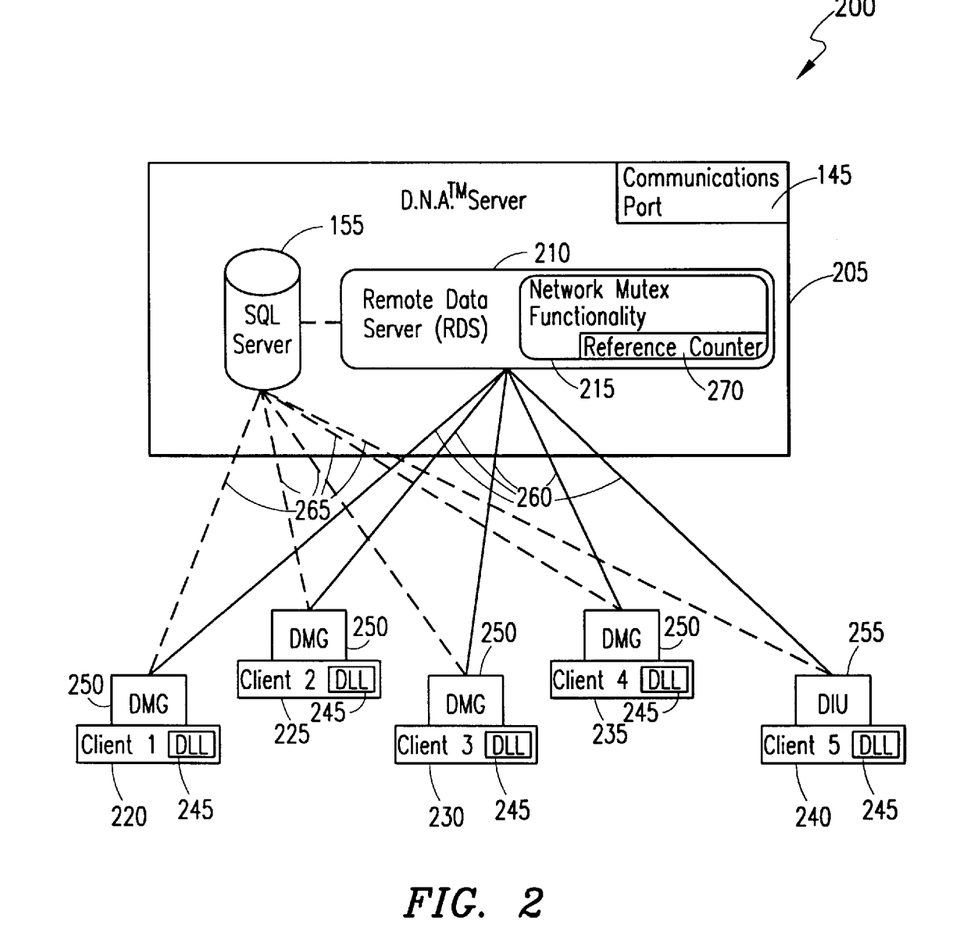
FIG. 2 illustrates a computer network with network mutex functionality according to the current invention.

FIG. 2 illustrates a computer network 200 that enables network-level locking control of network resources according to the current invention. The computer network 200 is shown with a Dynamic Network Administration (DNA) [Dynamic Network Administration (DNA) is a trademark of Ericsson, Inc.] server 205 that includes a remote data server (RDS) element 210, a first client 220, a second client 225, a third client 230, a fourth client 235, and a fifth client 240. Also shown are general network connections 260 and SQL network connections 265.

Although only one server and five clients are shown in the exemplary computer network 200, it is to be understood that a network with any number of servers, clients, routers, switches, bridges, etc. can benefit from the current invention. Furthermore, exemplary computer network 200 can be a heterogenous network and therefore composed of a network of networks, where each network within exemplary computer network 200 has its own protocols, topologies, etc. For example, the physical/protocol level of the logical network connections 260 and 265 can be WAN connections, LAN connections, dial-up modem connections, etc.

The server 205 is associated with an SQL server 155 and a communications port 145. The RDS element 210 incorporates network mutex (NM) functionality 215. Each of the five clients has a NM entry in its dynamic link libraries (DLL) 245. The first, second, third, and fourth clients 220, 225, 230, and 235 include directory manager (DMG) elements 250, and the fifth client 240 includes a directory import utility (DIU) element 255.

The DMG elements 250 are preferably graphical user interface (GUI) spreadsheets that facilitate the entry of telephone information into an electronic corporate directory. The DIU element 255 is preferably a utility for inputting data from flat or text files into an electronic corporate directory. However, the invention is not so limited; the elements at the clients can be, for example, any software element or software application generally.

The RDS element 210, DMG elements 250, DIU element 255, and equivalent elements are preferably implemented in software. For example, they, as well as applications in general, can be software modules located in each network device, e.g., the server 205 and the second client 225, that needs to lock network resources at the network level. Specifically, Windows NT (a trademark of Microsoft Corp. and available from same) can be selected as the operating system in the computer network 200. In this instance, general network connections 260 are preferably Windows NT Named Pipe Connections. Also, SQL network connections 265 are preferably Open Database Connectivity (ODBC) SQL Connections. In general, network connections 260 and SQL network connections 265 can be any logical or physical channels that are capable of data propagation. In fact, they can be the same logical or physical channel.

Though the NM functionality 215 of the current invention is preferably implemented in software, it can also be implemented in hardware, firmware, etc. When the invention is implemented in software, the software can be stored in any type of computer-accessible memory, e.g., volatile or nonvolatile, solid-state or not, fixed or removable media, etc. Also, the memory can be, e.g., RAM, ROM, EEPROM, magnetic, optical, DVD, etc., or a yet-to-be-developed equivalent. It should be noted that the NM functionality 215 of the current invention has a myriad of practical applications in the computer network arts. To wit, network mutexes enable the unlocking of a locked network resource even after the locking device crashes. Note also that although the NM functionality 215 is illustrated within the RDS element 210, the NM functionality 215 is preferably distributed throughout the network to all devices (e.g., first, second, third, fourth, and fifth clients 220, 225, 230, 235, and 240) that need to exclusively access network objects and resources (e.g., SQL server 155 and communications port 145) as well as those that can provide the requested access (e.g., server 205).

The NM functionality 215 of the current invention allows applications and elements (e.g., the DMG elements 250) on the network 200 to lock/unlock network objects and resources such as SQL servers (e.g., the SQL server 155), communication ports, (e.g., the communications port 145), device drivers, private branch exchange (PBX) ports, etc. These objects and resources may be accessed by a network mutex request sent from a network control software element (e.g., the RDS element 210 and the DIU element 255) residing in a client (e.g., the fifth client 240) or a server (e.g., server 205) attached to the network 200. If one element is accessing a resource and has it locked, then all subsequent attempts by other elements to access the resource will be rejected (unless, perhaps, the subsequent element is similar to the prior locking element as described further hereinbelow). No subsequent element will be able to access the resource until the prior locking element relinquishes control.

Figure 3A:
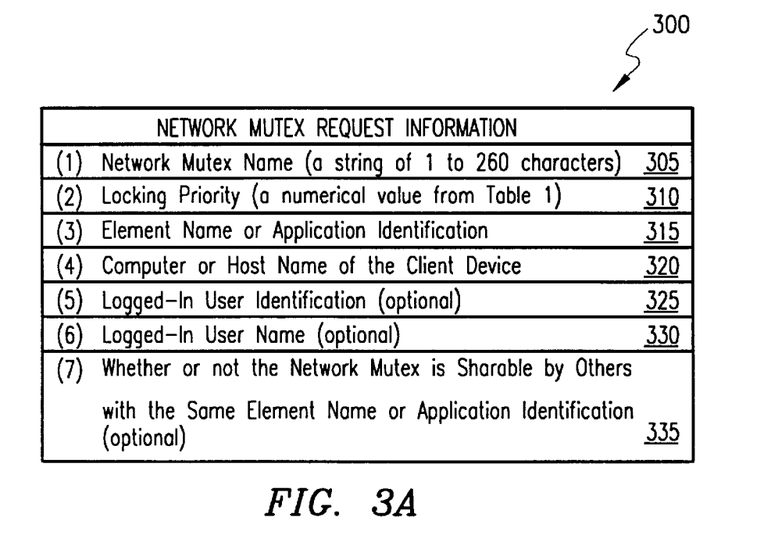
FIG. 3A illustrates network mutex request information according to the current invention.

Referring now to FIG. 3A, a network mutex request information table 300 is pictured. The first four items are required in a preferred embodiment, but the final three are optional. Hence, from four to seven of the seven items in the NM request information table 300 are transmitted from a requesting element (or application) to the RDS element 210 in each NM request. A network mutex name 305 is a string of between 1 and 260 characters and represents the network object or resource to be locked. A locking priority 310 permits the requesting element to set the priority of the network mutex. For example, applications that run in batch mode can have a higher priority than those that have a GUI. The locking priority is preferably selected from one of five possible numerical values as listed in Table 1.

TABLE 1

| Priority Label | Numerical Value |
| --- | --- |
| EMERGENCY_PRIORITY | 0x100 |
| HIGH_PRIORITY | 0x200 |
| MEDIUM_PRIORITY | 0x300 |
| LOW_PRIORITY | 0x400 |
| NO_PRIORITY | 0x500 |

It should be clarified that both the number of priority levels and each level's specific numerical value are exemplary only, and they should not be taken to be limiting of the current invention. The network mutex priority preferably defaults to MEDIUM_PRIORITY if no priority level is specified.

Within a presently preferred embodiment, it is contemplated to expand the number (enable the specification of a wider range) of priority levels beyond five when five is not satisfactory. This expansion can be accomplished by either adding or subtracting values to or from the base priorities listed in Table 1 as follows: XXXX_PRIORITY ±0x80. For instance, 0x80 can be subtracted from all five priority levels in Table 1 and also added to the "NO_PRIORITY" numerical value. This produces eleven different priority levels with numerical values from 80 to 580 (in hexadecimal).

The element name or application identification 315 of the requesting element or application is also included in each NM request. Furthermore, the computer or host name of the client device 320 is included in each NM request. Several optional parameters may also be transmitted. These optional parameters include the logged-in user identification 325 and the logged-in user name 330. These could be useful, for example, for tracing or priority purposes. Finally, in a preferred embodiment, an indication as to whether or not the network mutex is sharable by other clients with the same element name or application identification 335 is optionally sent. This permits multiple elements or applications that are equivalent to each other to share the same network mutex simultaneously.

Figure 3B:
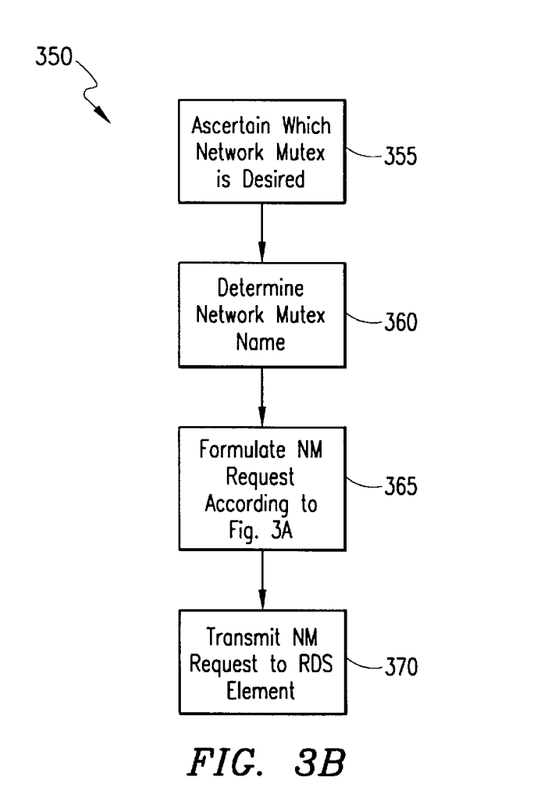
FIG. 3B illustrates in flowchart form a process of initiating a network mutex request according to the current invention.

Referring now to FIG. 3B, a flowchart 350 illustrates a method of initiating a NM request according to the current invention. The steps in flowchart 350 will be further explained by way of an example that refers to FIG. 2. In this example, the DMG element 250 of the first client 220 wishes to establish a network mutex via the NM functionality 215. At Step 355, the DMG element 250 ascertains that it desires a network mutex on the SQL server 155. After the network mutex name for the SQL server 155 has been determined by the DMG element 250 in Step 360, the DMG element 250 formulates the NM request in accordance with the items in the network mutex request information table 300. The DMG element 250 sends the formulated NM request to the RDS element 210 by way of the network mutex DLL 245 that resides on the DMG element 250. The NM request is transmitted over the relevant general network connection 260 by the first client 220 to the server 205 in Step 370.

Figure 4:
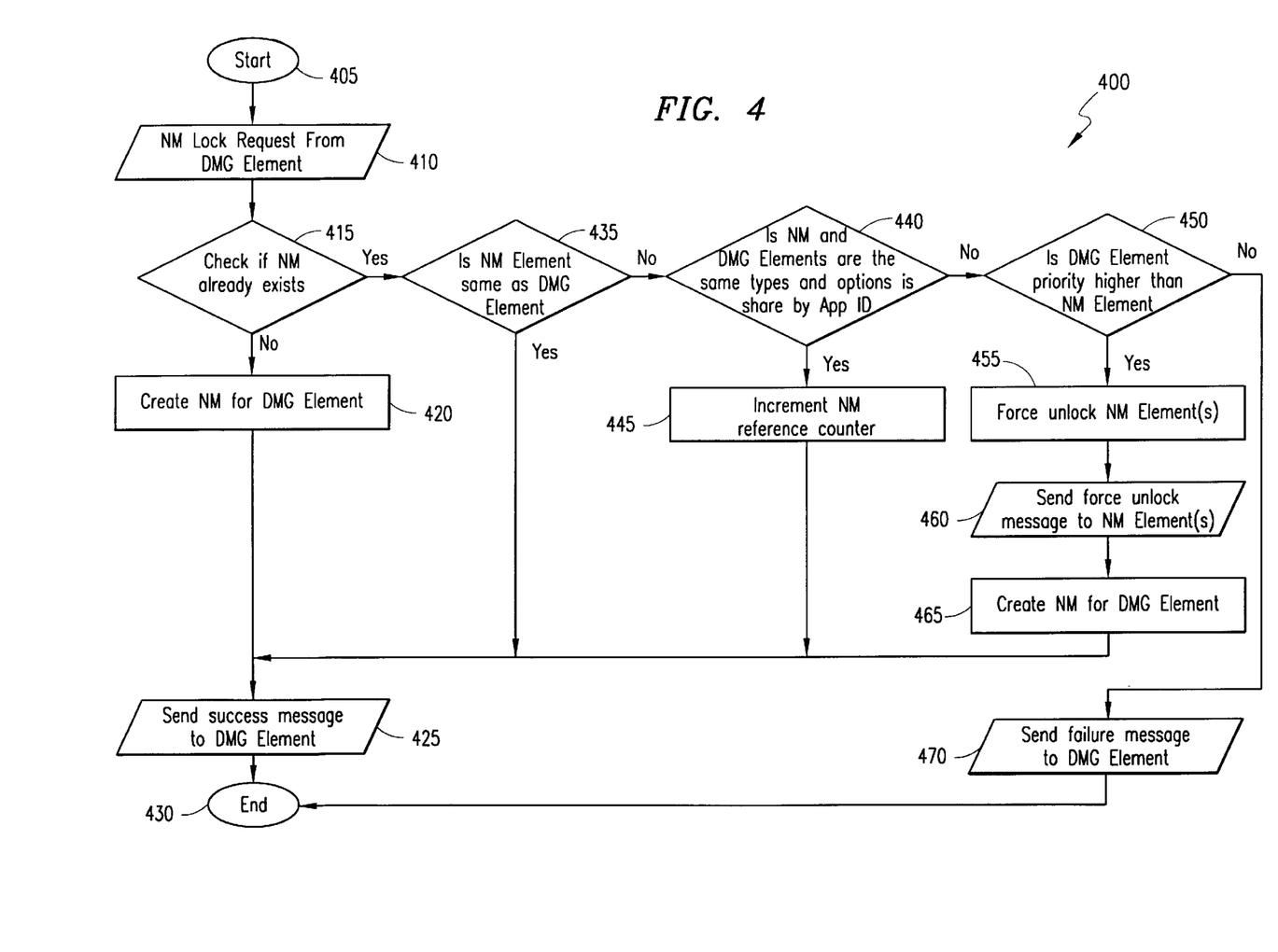
FIG. 4 illustrates in flowchart form a process of implementing a network mutex request.

Referring now to FIG. 4, a process of implementing a NM request according to the current invention is illustrated at flowchart 400. The RDS element 210 begins the process at Step 405. The RDS element 210 receives and analyzes the NM (lock) request from the DMG element 250 in Step 410. It is determined at Step 415 whether a network mutex already exists for the requested network resource (the SQL server 155 in this example). If not, the RDS element 210 creates a network mutex object in Step 420 for the DMG element 250 of the first client 220. Subsequently at Step 425, a message announcing the establishment of a network mutex is sent to the requesting DMG element 250 over the relevant general network connection 260. The process concludes at Step 430.

If a network mutex already exists at Step 415, the RDS element 210 will determine whether the element/client holding the network mutex is the same element/client as the requesting DMG element 250/first client 220. If so, then the RDS element 210 sends a message over the relevant general network connection 260 informing the DMG element 250 that it has successfully acquired the network mutex at Step 425. The process concludes at Step 430.

If the NM element or application (the element or application holding the network mutex) is not the same as the element or application requesting the network mutex at Step 435, the RDS element 210 proceeds to Step 440. At Step 440, the RDS element 210 determines whether the requested network mutex has the option to be sharable by elements and applications that are of equivalent type, e.g., have the same element name or application identification 315. The sharable option for the network mutex may be, for example, either set globally and permanently or set by the first requesting element in its network mutex request's optional parameter number seven, namely, whether the network mutex is sharable by others 335.

Continuing with Step 440 if the sharable option is enabled, the RDS element 210 checks whether the NM element is the same type as the requesting DMG element 250. If so, then the RDS element 210 increments a NM reference counter 270 (in FIG. 2). The value of the NM reference counter 270 indicates the number of equivalent elements or applications that are simultaneously locking the network mutex. After the NM reference counter 270 is incremented in Step 445, the RDS element 210 sends a message informing the DMG element 250 that it has successfully acquired the network mutex at Step 425 and concludes the process at Step 430.

If either question in Step 440 is answered in the negative, the RDS element 210 proceeds to Step 450. It is determined whether the priority of the requesting DMG element 250 (or the priority assigned to the present NM request by the DMG element 250 in the locking priority 310 item) is higher than the priority of the NM element (or the priority assigned to the network mutex by the NM element at the time of its request) at Step 450. If it is higher, the RDS element 210 forcibly unlocks the network mutex at Step 455. The RDS element 210 sends at Step 460 a force unlock message to the NM element (or elements if the network mutex is simultaneously held by more than one NM element). A new network mutex lock is created by the RDS element 210 for the requesting DMG element 250 at Step 465. Subsequently, the RDS element 210 sends a message informing the DMG element 250 that it has successfully acquired the network mutex at Step 425. The process concludes at Step 430.

If it is determined that the priority of the requesting DMG element 250 is lower or equal to that of the existing NM element at Step 450, the RDS element 210 proceeds to Step 470 and transmits a failure message to the requesting DMG element 250. The process concludes at Step 430.

Figure 5A:
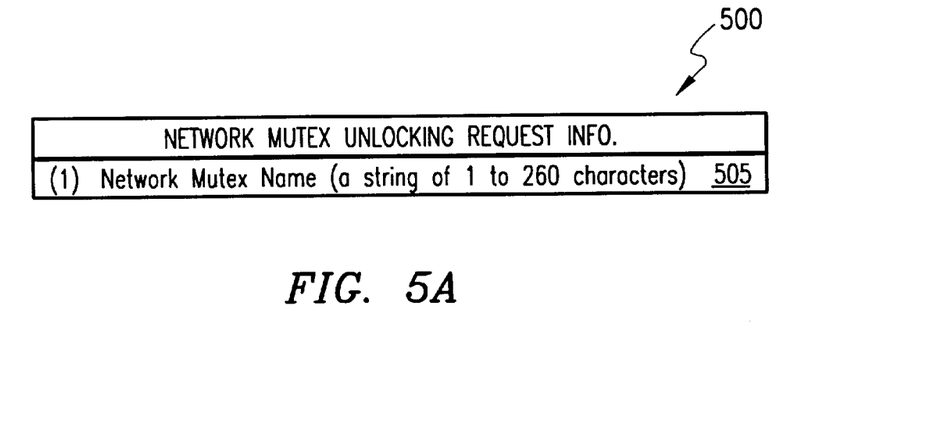
FIG. 5A illustrates network mutex unlocking request information.

Referring now to FIG. 5A, a network mutex unlocking request information table 500 is illustrated. When an element or application is ready to relinquish its network mutex lock on a network object or resource (e.g., the SQL server 155), the element or application (e.g., the DMG element 250 of the first client 220) transmits a NM unlocking request over the relevant general network connection 260 to the NM functionality 215 of the RDS element 210. The NM unlocking request according to a preferred embodiment includes the network mutex name 505.

Figure 5B:
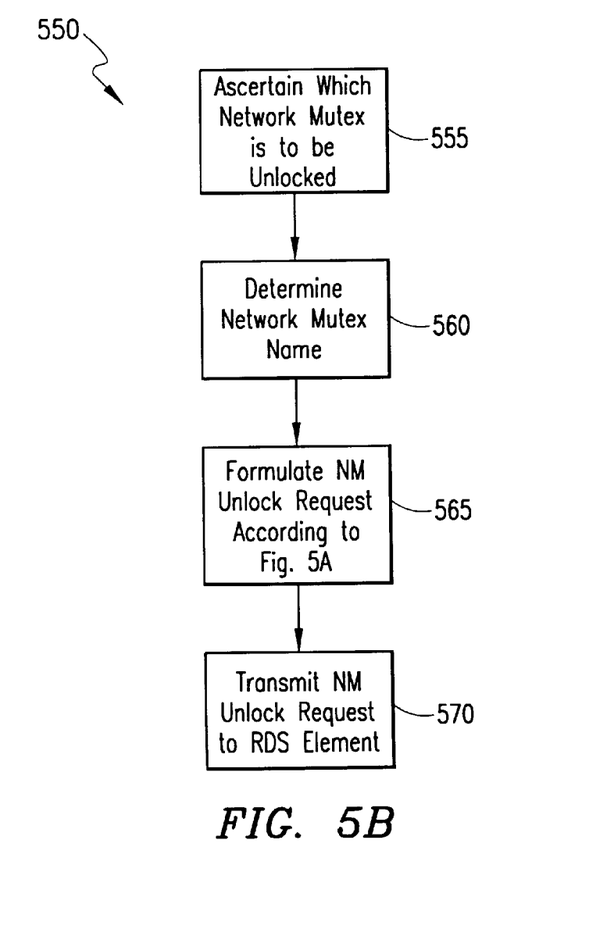
FIG. 5B illustrates in flowchart form a process of initiating a network mutex unlocking request.

Referring now to FIG. 5B, a flowchart 550 illustrates a method of initiating a NM unlock request according to the current invention. The steps in flowchart 550 will be further explained by way of continuing the example that refers to FIG. 2. In the example, the DMG element 250 of the first client 220 wishes to relinquish its network mutex via the NM functionality 215. At Step 555, the DMG element 250 ascertains that it desires to relinquish its network mutex on the SQL server 155. After the network mutex name for the SQL server 155 has been determined by the DMG element 250 in Step 560, the DMG element 250 formulates the NM unlocking request in accordance with the item in the network mutex unlocking request information table 500.

The DMG element 250 sends the formulated NM unlocking request to the RDS element 210 by way of the network mutex DLL 245 that resides on the DMG element 250. The NM unlocking request is transmitted over the relevant general network connection 260 by the first client 220 to the server 205 in Step 570.

Figure 6:
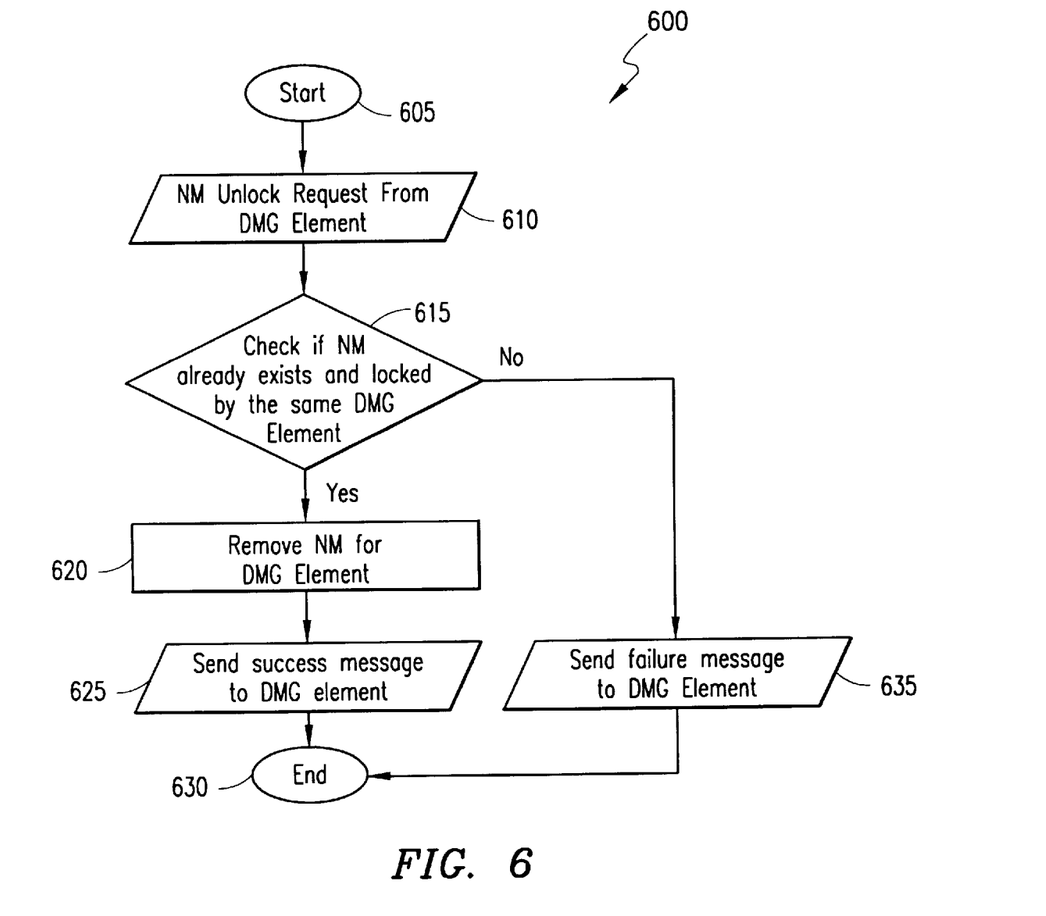
FIG. 6 illustrates in flowchart form a process of removing a network mutex.

Now referring to FIG. 6, a flowchart 600 illustrates a process of removing a network mutex according to the current invention. The RDS element 210 begins the process at Step 605. The NM unlock request from the DMG element 250 is received and analyzed in Step 610. The RDS element 210 determines at Step 615 whether a network mutex already exists and, if so, whether it is locked by the requesting DMG element 250. If the network mutex exists and is locked by the requesting DMG element 250, the RDS element 210 removes the network mutex for the DMG element 250 at Step 620. Removal may be completed by eliminating the network mutex if the requesting DMG element 250 is the only locking element. If, on the other hand, the requesting DMG element 250 is not the only locking element, the RDS element 210 satisfies the NM unlocking request by decrementing the reference counter 270.

After the network mutex is removed at Step 620, the RDS element 210 sends a message at Step 625 informing the requesting DMG element 250 that the NM has been successfully unlocked. If either question at Step 615 is answered in the negative, the RDS element 210 proceeds to Step 635, where it transmits a failure message over the relevant general network connection 260 to the requesting DMG element 250. The process concludes at Step 630 after the transmission of either a failure or a success message.

It should be noted that the processes represented by FIGS. 3B, 4, 5B, and 6 can be modified or supplanted by other methods without departing from the spirit and scope of the invention as defined by the claims. In fact, modifications and/or other methods will be apparent to routineers after studying and understanding the teachings of the current invention.

Referring now jointly to FIGS. 4 and 6, in a preferred embodiment the RDS element 210 sends certain information to a client to which the RDS element 210 is sending a failure or force unlock message (e.g., Steps 460, 470, and 635). The information includes which element or application has locked the network mutex, the location of the element or application on the network, and the duration for which the object has been locked. It can also include, where applicable, the logged-in user identification and name 325 and 330.

In another aspect of a preferred embodiment of the current invention, provisions are included within the NM functionality 215 to guard against malfunctions by a client, e.g., the first client 220. If the DMG element 250 of the first client 220, while holding a lock on a NM object, crashes, disconnects from the RDS element 210, or otherwise malfunctions before unlocking the NM object, the RDS element 210 unlocks the network mutex and permits other clients' elements and applications to lock the network mutex.

In conclusion, the current invention provides at least the following benefits. First, the invention provides the ability for any element or application on a network to lock/unlock network objects/resources at one or more central locations such as servers. The network objects/resources can be intelligent objects, non-intelligent objects, or virtual objects. The non-intelligent communications port 145 can therefore be locked with the NM functionality 215. Second, the invention keeps track of which element/device has locked an object, the location of the locking element/device on the network, and the amount of time the object has been locked.

Furthermore, the invention enables the setting of locking priorities and the overriding of an existing lock by a NM (lock) request with a higher priority. For example, batch-mode applications can have a higher NM priority than GUI applications, i.e., applications that interact with a user. In this instance, batch jobs can forcibly unlock and acquire the network mutex. Fifth, network mutex locks can be shared by elements or applications of the same type. For example, if a number of the DMG elements 250 (from, e.g., the first, second, and third clients 220, 225, and 230) attempt to lock the same NM-lockable object that is sharable by element/application, then regardless of which request the RDS element 210 receives first, eventually all three DMG elements 250 will be permitted to lock the network mutex. If a different element/application (e.g., the DIU element 255) subsequently requests a lock on the same network mutex, it will be rejected (providing it has the same or a lower priority).

As noted above, a computer network according to the current invention provides the ability to lock virtual objects. An example of a virtual object is a file system. The NM functionality 215 may enhance the performance of the file system by limiting the number of users accessing it at one time. When accessing the files in a NM-locked file system with a sharable status, a coupled file access invention that is described in a related U.S. patent application with Ser. No. 08/996,940, filed on Dec. 23, 1997, and allowed on Aug. 26, 1999, which is hereby incorporated by reference in its entirety herein, may be advantageously used. Coupled file access enables, for example, coupled files to be simultaneously accessed by multiple clients.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method in a computer network system for locking network assets, comprising the steps of:
　formulating, at a client, a network mutex (NM) request, wherein a lock on a network asset is requested;
　transmitting said NM request from said client to a server;
　determining whether said network asset may be locked in response to said NM request;
　locking said network asset in response to the determination; and
　wherein the step of determining further comprises the steps of:
　　determining whether an existing NM software module is of a substantially similar type to a requesting software module and whether a sharable option is enabled for the existing NM; and
　　incrementing a reference counter if said existing NM software module is of a substantially similar type to said requesting software module and said sharable option is enabled for the existing NM.

2. The method of claim 1, wherein the step of formulating further comprises the step of:
　including information identifying a specific NM of said network asset in said NM request.

3. The method of claim 2, wherein the step of formulating further comprises the step of:
　including a locking priority in said NM request.

4. The method of claim 2, wherein the step of formulating further comprises the steps of:
　formulating said NM request at a software module; and
　including an indication in said NM request of whether said specific NM is sharable by other software modules of a substantially type similar to said software module.

5. The method of claim 1, wherein the step of determining further comprises the steps of:
　determining whether the NM already exists for said network asset; and
　creating the NM for said network asset if the NM does not already exist for said network asset.

6. The method of claim 1, wherein the step of determining further comprises the steps of:
　determining whether an existing NM software module is identical to a requesting software module; and
　sending a success message to said client if said existing NM software module is identical to said requesting software module.

7. The method of claim 1, wherein the step of determining further comprises the step of:
　determining whether a first priority of a requesting software module is higher than a second priority of an existing NM software module.

8. A method in a computer network system for locking network assets, comprising the steps of:
　formulating, at a client, a network mutex (NM) request, wherein a lock on a network asset is requested;
　transmitting said NM request from said client to a server;
　determining whether said network asset may be locked in response to said NM request;
　locking said network asset in response to the determination; and
　wherein the step of locking further comprises the steps of:
　　if a first priority of a requesting software module is higher than a second priority of an existing NM software module, unlocking the existing NM of said existing NM software module;
　　creating the NM for said requesting software module; and
　　sending a success message to said client.

9. A method in a computer network system for locking network assets, comprising the steps of:
　formulating, at a client, a network mutex (NM) request, wherein a lock on a network asset is requested;
　transmitting said NM request from said client to a server;
　determining whether said network asset may be locked in response to said NM request;
　locking said network asset in response to the determination; and
　further including the step of:
　　sending a failure message to said client if a first priority of said client is not higher than a second priority of an existing NM.

10. A method in a computer network system for unlocking network assets, comprising the steps of:
　formulating, at a client, a network mutex (NM) unlock request, wherein a lock on a network asset is requested to be relinquished;
　transmitting said NM unlock request from said client to a server;
　processing said NM unlock request to determine whether said lock on said network asset may be relinquished;
　releasing said network asset in response to the determination;
　wherein the step of processing further includes the step of:
　　determining whether the NM already exists for said network asset and, if so, whether an existing NM software module is of identical or of substantially similar type to a requesting software module; and
　wherein the step of processing still further includes the step of:
　　sending a failure message to said client if said existing NM software module is neither of identical or of substantially similar type to said requesting software module.

11. A method in a computer network system for controlling network assets, comprising the steps of:

formulating, at a client, a network mutex (NM) request, wherein control of a network asset is requested;

transmitting said NM request from said client to a server;

determining whether said network asset may be controlled in response to said NM request;

enabling control of said network asset to said client in response to the determination; and wherein the step of determining further comprises the steps of:

comparing an existing NM software module with a requesting software module to determine whether said existing NM software module and said requesting software module are of substantially similar type;

checking a sharable option to determine whether the NM may be shared by software modules of substantially similar types; and incrementing a reference counter if said existing NM software module is of a substantially similar type to said requesting software module and the NM may be shared by software modules of substantially similar types.

12. The method of claim 11, wherein said control further includes the ability to lock said network asset.

13. A method in a computer network system for controlling network assets, comprising the steps of:

formulating, at a client, a network mutex (NM) request, wherein control of a network asset is requested;

transmitting said NM request from said client to a server;

determining whether said network as set may be controlled in response to said NM request;

enabling control of said network asset to said client in response to the determination;

wherein said control further includes the ability to lock said network asset; and wherein the step of determining further comprises the steps of:

comparing a first priority of an existing NM software module and a second priority of a requesting software module to determine whether said second priority is greater than said first priority; and withdrawing control of said network asset from said existing NM software module if said second priority is greater than said first priority.

14. The method of claim 11, wherein said control further includes the ability to unlock said network asset.

15. The method of claim 14, wherein the step of determining further comprises the steps of:

ascertaining the identity of an existing NM software module to determine whether the NM is controlled by an unlock requesting software module; and removing said unlock requesting software module from the NM if the NM is controlled by said unlock requesting software module.

16. A computer program product comprising at least one electronically-accessible medium having electronically-implementable instructions thereon, said electronically-implementable instructions causing one or more elements of a computer network to implement the steps of:

formulating, at a client, a network mutex (NM) request, wherein a lock on a network asset is requested;

transmitting said NM request from said client to a server;

determining whether said network asset may be locked in response to said NM request;

locking said network asset in response to the determination; and wherein the step of determining further comprises the steps of:

determining whether an existing NM software module is of a substantially similar type to a requesting software module and whether a sharable option is enabled for the existing NM; and incrementing a reference counter if said existing NM software module is of a substantially similar type to said requesting software module and said sharable option is enabled for the existing NM.

17. The method of claim 1, wherein said network asset comprises at least one of an entire database server and a communications port.

18. The method of claim 1, wherein said NM request comprises at least one of a logged-in user identification and a logged-in user name.

19. The method of claim 1, further including the step of:

automatically unlocking said network asset if said client crashes or disconnects without requesting that said network asset be unlocked.

20. The method of claim 8, wherein said client comprises a computer program application.

21. The method of claim 9, wherein said failure message includes an indication as to which client is associated with said existing NM.

22. The method of claim 13, wherein said client comprises a computer program application.

23. A method for manipulating network-level locks in a network having network elements of differing priority levels, comprising the steps of:

requesting, by a first network element having a first priority, a first lock on a network-level asset;

establishing said first lock on said network-level asset responsive to said step of requesting by said first network element;

requesting, by a second network element having a second priority, a second lock on said network-level asset, said second priority being higher than said first priority;

unlocking said first lock on said network-level asset responsive to said step of requesting by said second network element and to said second priority being higher than said first priority; and establishing said second lock on said network-level asset.

24. The method of claim 23, wherein said first and second network elements each comprise at least one of a computer program application, a computer terminal, and a user identification.

* * * * *

UNITED STATES PATENT AND TRADEMARK OFFICE
CERTIFICATE OF CORRECTION

PATENT NO. : 6,105,057
DATED : August 15, 2000
INVENTOR(S) : Kuftedjian et al.

It is certified that error appears in the above-identified patent and that said Letters Patent is hereby corrected as shown below:

Column 11,
Line 34, delete "as set" replace with -- asset --

Signed and Sealed this

Eighth Day of January, 2002

Attest:

JAMES E. ROGAN
*Attesting Officer*    *Director of the United States Patent and Trademark Office*